(12) United States Patent
Decottignies

(10) Patent No.: US 8,602,265 B2
(45) Date of Patent: Dec. 10, 2013

(54) STOPPER VALVE AND METHOD FOR MAKING SUCH VALVE

(75) Inventor: Laurent Decottignies, Cergy (FR)

(73) Assignee: Aptar France SAS, Le Neubourg (FR)

( * ) Notice: Subject to any disclaimer, the term of this patent is extended or adjusted under 35 U.S.C. 154(b) by 828 days.

(21) Appl. No.: 12/671,143

(22) PCT Filed: Jul. 18, 2008

(86) PCT No.: PCT/FR2008/051361
§ 371 (c)(1),
(2), (4) Date: Jan. 28, 2010

(87) PCT Pub. No.: WO2009/024694
PCT Pub. Date: Feb. 26, 2009

(65) Prior Publication Data
US 2010/0200616 A1 Aug. 12, 2010

(30) Foreign Application Priority Data

Aug. 1, 2007 (FR) ..................................... 07 56862

(51) Int. Cl.
*B65D 37/00* (2006.01)
(52) U.S. Cl.
USPC .......................................... 222/207; 222/494
(58) Field of Classification Search
USPC ......... 222/207, 256, 259, 260, 380, 491, 494, 222/571, 209, 490, 492, 493
See application file for complete search history.

(56) References Cited

U.S. PATENT DOCUMENTS

| | | | | |
|---|---|---|---|---|
| 3,991,916 A | * | 11/1976 | Del Bon | 222/402.13 |
| 4,536,179 A | | 8/1985 | Anderson et al. | |
| 4,807,784 A | * | 2/1989 | Jupin et al. | 222/207 |
| 4,962,870 A | * | 10/1990 | Schneider | 222/207 |
| 5,108,667 A | | 4/1992 | Kamen et al. | |
| 5,301,850 A | * | 4/1994 | Gueret | 222/494 |
| 6,116,475 A | * | 9/2000 | Delage | 222/494 |
| RE38,328 E | | 11/2003 | Gueret | |
| 2005/0211736 A1 | * | 9/2005 | Finlay et al. | 222/509 |
| 2006/0186139 A1 | * | 8/2006 | Laidler et al. | 222/207 |
| 2010/0012680 A1 | * | 1/2010 | Canfield et al. | 222/207 |

FOREIGN PATENT DOCUMENTS

| | | | |
|---|---|---|---|
| DE | 103 08 727 B3 | | 6/2004 |
| DE | 102006012302 A1 | * | 9/2007 |
| EP | 0 713 832 A1 | | 5/1996 |
| GB | 2 402 712 A | | 12/2004 |
| JP | 59-071336 A | | 4/1984 |
| WO | WO 2004073870 A2 | * | 9/2004 |
| WO | WO 2007104561 A2 | * | 9/2007 |

* cited by examiner

*Primary Examiner* — Paul R Durand
*Assistant Examiner* — Charles P Cheyney
(74) *Attorney, Agent, or Firm* — Sughrue Mion, PLLC

(57) ABSTRACT

A shutter member for a fluid dispenser member, the shutter member having a substantially rigid base body and an elastically deformable diaphragm, the body and the diaphragm being made of materials that are chemically compatible such that the material of the diaphragm adheres to the material of the body, the body defining an anchor zone and a fluid-passing zone. The diaphragm adheres to the anchor zone and extends over the fluid-passing zone, the fluid-passing zone including an interface that is secured to the fluid-passing zone but that does not adhere to the diaphragm, thereby defining an outlet channel for fluid between the interface and the diaphragm in the presence of fluid under pressure.

13 Claims, 4 Drawing Sheets

STOPPER VALVE AND METHOD FOR MAKING SUCH VALVE

FIELD OF INVENTION AND BACKGROUND

The present invention relates to a shutter member for a fluid dispenser member, a fluid dispenser head including such a shutter member, a fluid dispenser including such a shutter member, and a method of fabricating such a shutter member. In the fields of perfumery, cosmetics, or even pharmacy, fluid dispenser members, such as pumps and valves, incorporate one or more shutter members enabling the fluid for dispensing to be passed in selective manner. In a pump, an inlet valve is generally provided separating the reservoir from the pump chamber, and an outlet valve is provided separating the pump chamber from the dispenser orifice.

The present invention relates more particularly to a shutter member comprising a base body that is substantially rigid and a diaphragm that is elastically deformable. The base body forms a valve seat while the deformable diaphragm forms a movable valve member that moves in the presence of fluid under pressure. From the prior art, e.g. as disclosed in EP 0 713 832, a dispenser head is known that includes a shutter that is constituted by a resilient lip that moves away from a seat by bending. The seat is made of a first material in the form of a rigid plastics material and the lip is made of a second material in the form of an elastomer that is chemically incompatible with the plastics material of the sheet. In order to fasten the lip on the seat, a fastener element is provided that is formed by the lip and that is embedded in the rigid material constituting the seat. The fastener element performs a mechanical fastener function. For this purpose, the fastener element presents an appropriate configuration enabling it to be held or trapped inside a closed space formed by the material constituting the seat. It can consequently be understood that the configuration of the diaphragm and of the seat is relatively complicated in order to ensure that the mechanical retention function is achieved between those two chemically incompatible materials.

CERTAIN OBJECTS OF THE INVENTION

An object of the present invention is to remedy the above-mentioned drawbacks of the prior art by defining a shutter with an elastically deformable diaphragm that is fastened in simplified manner.

To achieve this object, the present invention provides a shutter member for a fluid dispenser member, the shutter member comprising a substantially rigid base body and an elastically deformable diaphragm, the body and the diaphragm being made of materials that are chemically compatible such that the material of the diaphragm adheres to the material of the body, the body defining an anchor zone and a fluid-passing zone, the shutter member being characterized in that the diaphragm adheres to the anchor zone and extends over the fluid-passing zone, the fluid-passing zone including an interface that is secured to the fluid-passing zone but that does not adhere to the diaphragm, thereby defining an outlet channel for fluid between the interface and the diaphragm in the presence of fluid under pressure. According to an advantageous characteristic of the invention, the anchor zone surrounds the fluid-passing zone except at a side defining an opening for selectively dispensing the fluid. According to another aspect of the invention, the fluid-passing zone may be curved, the diaphragm matching the curvature of the fluid-passing zone at rest and deforming in substantially symmetrical manner in the presence of fluid under pressure. The diaphragm thus deforms in controlled manner.

In a first embodiment, the interface comprises a coating applied to the fluid-passing zone, the coating adhering to the fluid-passing zone and not adhering to the diaphragm. Under such circumstances, the body may be made of a material selected from the polyolefin group, e.g. polyethylene or polypropylene; the diaphragm may be made of a material selected from the group of elastomers that adhere to polyolefins; and the interface coating may be made of a material selected from the group of elastomers and styrenes. Such a shutter member may be made by a triple injection method using three different plastics materials.

In a second embodiment of the invention, the interface is formed by the fluid-passing zone that has been chemically modified by treatment, such as plasma treatment, so that the diaphragm does not adhere thereto. By way of example, the plasma treatment breaks a covalent bond, thereby preventing the diaphragm from adhering thereto.

The present invention also provides a fluid dispenser head for associating with a dispenser member, the head including a shutter member as defined above, and acting as an outlet shutter from which the user takes the fluid. Additionally, or in a variant, the shutter member of the dispenser head may act as an outlet valve for a pump chamber. The shutter member of the present invention may be used equally well in a dispenser member that is constituted by a pump or by a valve. The shutter member may act as an inlet valve, as an outlet valve, and/or as a shutter member at the dispenser orifice. Nevertheless, a preferred application is that of an outlet shutter member at the dispenser opening.

The present invention also provides a fluid dispenser including a shutter member as defined above.

The present invention also defines a method of fabricating a shutter member for a fluid dispenser member, the shutter member comprising a substantially rigid base body and an elastically deformable diaphragm, the body and the diaphragm being made of materials that are chemically compatible such that the material of the diaphragm adheres to the material of the body, the body defining an anchor zone and a fluid-passing zone, the method being characterized in that an interface coating is molded on the fluid-passing zone, the coating adhering to the fluid-passing zone, and in that the diaphragm is subsequently molded on the anchor zone and on the coating, the diaphragm adhering to the anchor zone but not adhering to the coating, thereby defining a fluid outlet channel between the coating and the diaphragm in the presence of fluid under pressure.

The present invention also provides a second method of fabricating a shutter member for a fluid dispenser member, the shutter member comprising a substantially rigid base body and an elastically deformable diaphragm, the body and the diaphragm being made of materials that are chemically compatible such that the material of the diaphragm adheres to the material of the body, the body defining an anchor zone and a fluid-passing zone, the method being characterized in that the fluid-passing zone is chemically treated so that the diaphragm does not adhere thereto, and in that the diaphragm is subsequently molded on the anchor zone and on the fluid-passing zone, the diaphragm adhering to the anchor zone but not adhering to the treated fluid-passing zone, thereby defining an outlet channel for the fluid between the treated fluid-passing zone and the diaphragm in the presence of fluid under pressure.

The spirit of the invention is thus to apply surface treatment to the base body of a shutter member made of a material that is chemically compatible with the material of the deformable diaphragm so as to be capable of molding the diaphragm on the body without the diaphragm adhering in the treated zone, specifically the fluid-passing zone, thereby forming an outlet channel and a dispenser orifice that can be shut. The surface treatment is preferably performed on the base body, however it could alternatively be performed on the elastically deformable diaphragm. Treatment of both the base body and the diaphragm is not to be excluded. Nevertheless, given that the traditional injection molding method for such a shutter member comprises initially molding the base body and subsequently overmolding or co-molding the deformable diaphragm onto the base body, it is practical and fast to apply the surface treatment to the base body over the anchor zone(s). This applies regardless of whether an interface coating is applied or the fluid-passing zone is chemically treated.

BRIEF DESCRIPTION OF THE DRAWINGS

The invention is described below in greater detail with reference to the accompanying drawings showing an embodiment of the invention by way of non-limiting example.

In the figures.

DETAILED DESCRIPTION OF CERTAIN EMBODIMENTS

Figure 1:
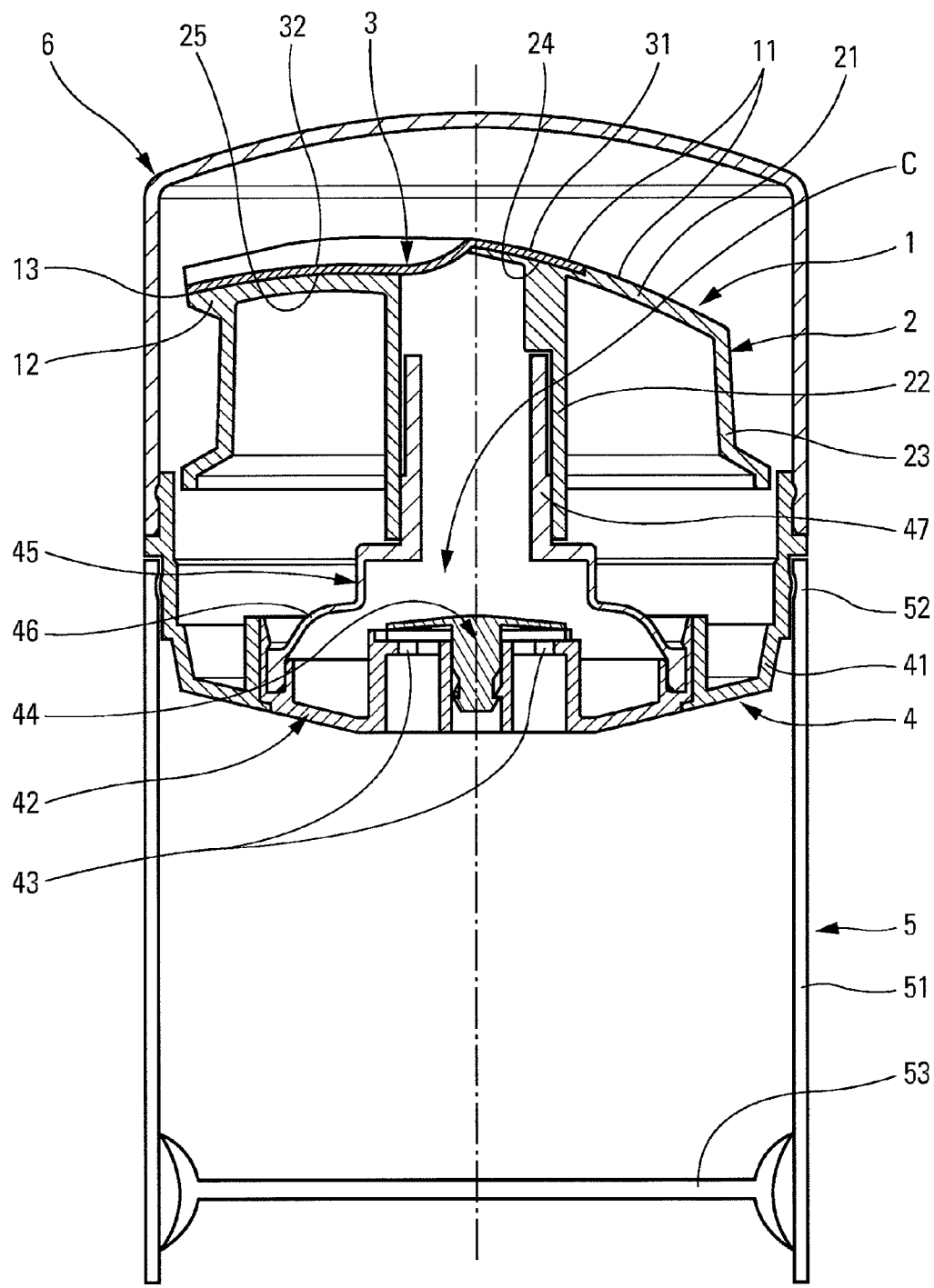
FIG. 1 is a vertical cross-section view through a fluid dispenser incorporating a shutter member of the present invention.
Figure 2:
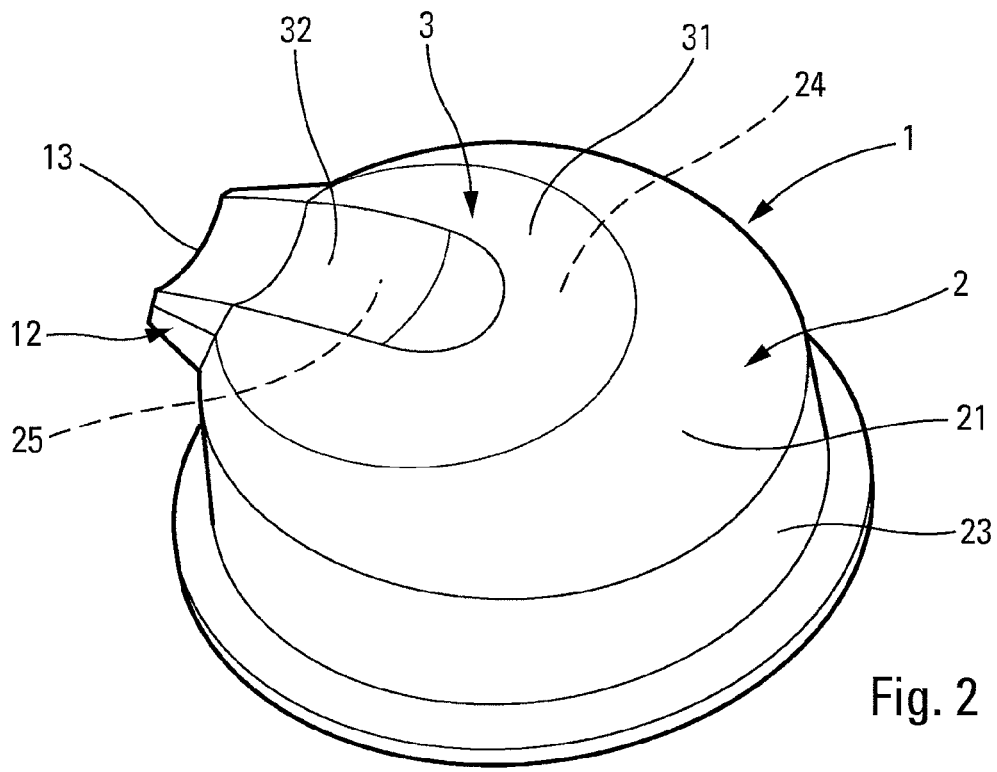
FIGS. 2, 3, and 4 are perspective views of the dispenser head of the FIG. 1 dispenser as seen from above and incorporating the shutter member of the invention.
Figure 3:
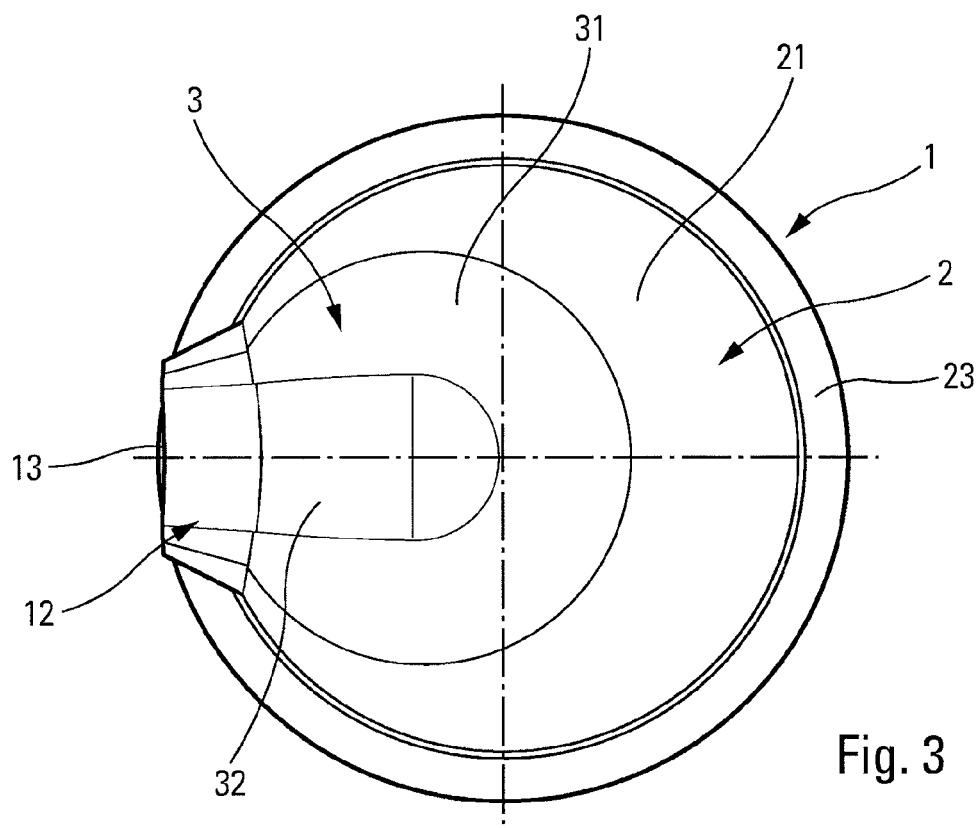

The description begins in general terms with reference to FIG. 1, describing the structure of a fluid dispenser incorporating a shutter member in a non-limiting embodiment of the invention. The dispenser comprises a dispenser member mounted on a reservoir 5. Optionally, the dispenser member may be provided with a protective cap 6. In this example the dispenser member incorporates a pump 4 associated with a dispenser head 1 for dispensing the fluid. In the present embodiment, the shutter member of the invention is incorporated in the dispenser head 1. Nevertheless the shutter member of the invention could equally well, in a different embodiment, be incorporated directly in the pump 4, e.g. at its inlet valve.

The reservoir 5 comprises a slide cylinder 51 defining at its top end an opening 52 that acts as a neck for receiving the pump 4. The cylinder 51 is provided with a follower piston or scraper 53 that slides in sealed manner inside the cylinder 51 progressively as the fluid is extracted from the reservoir by the pump 4. The follower piston 53 moves in response to suction generated in the reservoir each time the pump 4 is actuated. Instead of a reservoir 5, it would be possible to use any other type of reservoir without thereby going beyond the ambit of the invention. By way of example, provision could be made for a deformable can or for a flexible bag.

The pump 4 is a flexible-walled pump that does not make use of a sliding piston and that does not make use of a return spring. The pump 4 defines a pump chamber C of volume that is varied by deforming a flexible wall 46 that also performs the function of a return spring enabling the chamber to be restored to its rest position. This is one particular type of pump: nevertheless, any other type of pump, e.g. with a sliding piston, could be used in the ambit of the present invention.

The pump 4 in this embodiment includes a fastener cup 41 that is engaged in leaktight manner in the opening 52 of the cylinder 51. Optionally, the cup 4 may serve as a support for holding the cap 6. The cup 4 also serves as a support for the core of the pump, comprising in this embodiment a base 42 and a flexible part 45. The base 42 is fastened in leaktight and preferably permanent manner inside the cup 41. The base 42 forms a fluid inlet in the form of a plurality of holes 43 communication with the reservoir 5. The base 42 is provided with an inlet valve member 44 that is movable relative to the base 42 so as to shut the inlet holes 43 in selective manner. More precisely, the valve member 44 may be thought of as being the moving member of a valve that is to come into leaktight contact with a valve seat formed by the base 42 around the inlet holes 43. The flexible part 45 is anchored in stationary and leaktight manner on the base 42 so that together they define a pump chamber C of variable volume. The flexible part 45 has a flexible wall 46 that is elastically deformable. Furthermore, the part 45 has a rigid axial sleeve 47 that defines the inside of an outlet duct for the fluid.

The pump 4 includes or is associated with a dispenser head 1 that is mounted in leaktight manner on the sleeve 47. The dispenser head 1 has a substantially rigid base body 2 and an elastically deformable diaphragm 3. The base body 2 includes a connection bushing 22 engaged around or inside the sleeve 47. The base body 2 also has an outer peripheral skirt 23 that surrounds the bushing 22. The dispenser head 1 also has a bearing surface 11 that may be formed in part by the body 2 via a top wall 21 and by the elastically deformable diaphragm 3.

According to the invention, the diaphragm 3 is fastened at 31 to the body 2 via an anchor zone 24. The diaphragm 3 also rests without adhesion at 32 on the body 2 in a zone 25 for passing fluid. This fluid-passing zone 25 extends to an outer edge forming a dispenser opening 13. Advantageously, this dispenser opening is provided in register with a dispenser spout 12.

The operating cycle of the FIG. 1 dispenser is very simple. By pressing on the bearing surface 11, the dispenser head 1 is caused to move axially downwards, this being made possible by the flexible wall 46 deforming. The deformation of this wall results in the volume of the pump chamber C being decreased, thereby increasing the pressure of the fluid inside the chamber. Consequently, the portion 32 of the diaphragm 3 lifts off the fluid-passing zone 25, thereby creating an outlet channel 14 for the fluid under pressure. The user can then recover the fluid from the opening 13 at the end of the spout 12. When the axial pressure on the head 1 is released, the elastic memory of the flexible wall 46 returns the dispenser head 1 to its initial, rest position as shown in FIG. 1. During this return towards the initial position, suction is created inside the reservoir 5, and the follower piston 53 is subjected to said suction so as to be constrained to move by sliding towards the pump 4. The operating cycle is then terminated.

Figure 4:
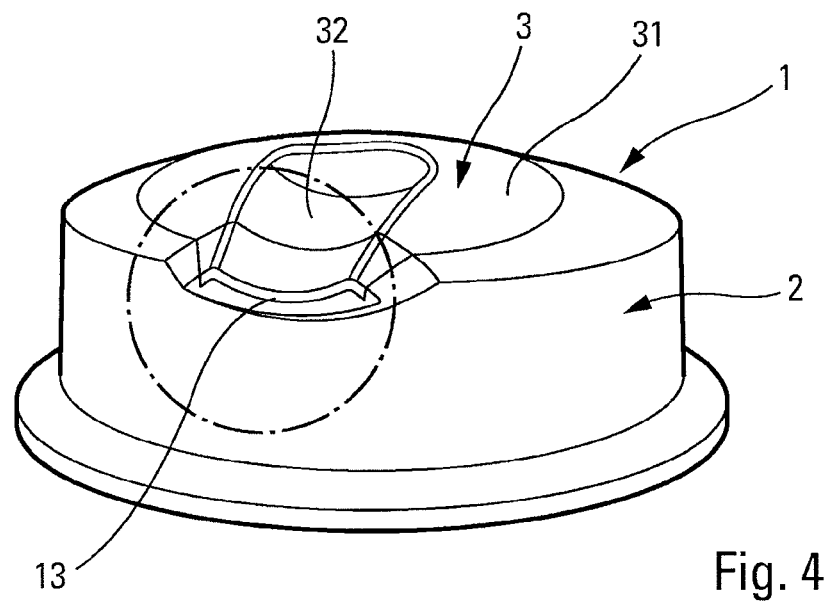
Figure 5:
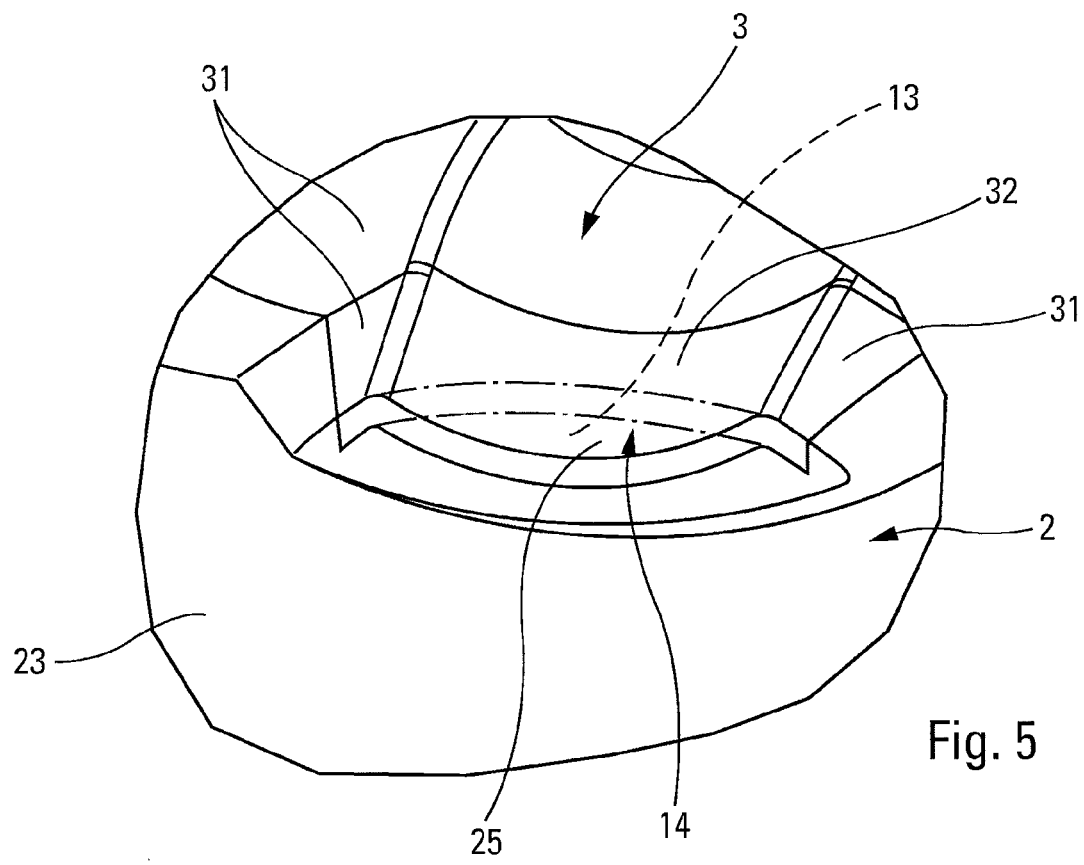
FIG. 5 is a view on a much larger scale showing a detail of FIG. 4.

Reference is now made to FIGS. 2 to 5 to describe in detail the structure, the operation, and the method of fabricating the dispenser head that incorporates the shutter member of the invention. The top wall of the body 2 may be subdivided into a plurality of zones, specifically a peripheral zone 21 defining part of the bearing wall 11, an anchor zone 24 whereby the diaphragm 31 is fastened, and a fluid-passing zone 25 on which the diaphragm rests without adhesion. The outer peripheral zone 21 presents a crescent-shaped configuration within which the anchor zone 24 is inscribed. This anchor zone 24 also presents a crescent-shaped configuration within which the fluid-passing zone 25 is inscribed. The anchor and fluid-passing zones 24 and 25 are labeled in FIG. 2 with dashed attachment lines, given that they are, in fact, located under the deformable diaphragm 3 and are therefore not visible. The diaphragm 3 forms an anchor portion 31 that is fastened to the anchor zone 24 and a fluid-passing portion 32 that rests on the fluid-passing zone 25 without adhering thereto. The fluid-passing zone 25 is surrounded by the anchor zone 24 except at an outside edge. In equivalent manner, the fluid-manner portion 32 of the diaphragm 3 is surrounded by the anchor zone 31 except at an outside edge, thereby co-operating with the underlying fluid-passing zone 25 to define the opening 13 for dispensing the fluid. With reference more particularly to FIGS. 4 and 5, it can be seen that the fluid-passing portion 32 of the diaphragm 3 is curved so as to form a depression that is truncated at the opening 13. Because the fluid-passing portion 32 fits closely to the shape of the fluid-passing zone 25, it can readily be deduced that the fluid-passing zone also presents this curved depressed shape. Nevertheless, the fluid-passing portion 32 is locally out of contact with the fluid-passing zone 25 in register with the connection bushing 22. In FIG. 5, dashed lines show the shape of the diaphragm when it is deformed by the fluid under pressure. Its curvature is then reversed relative to the rest position. The outlet channel 14 is then formed: the opening 13 then presents the shape of an eye or of a shuttle.

According to a characteristic of the invention, the material constituting the body 2 is a rigid plastics material that is chemically compatible or miscible with the material constituting the diaphragm 3, which material may advantageously be a thermoplastic elastomer. In other words, the materials constituting the body and the diaphragm are naturally capable of adhering by chemical bonding. Nevertheless, according to the invention, this chemical bonding is neutralized by chemically modifying the surface of the body 2 in the fluid-passing zone 25. This surface chemical modification is advantageously obtained by plasma treatment, e.g. using an air plasma. The effect of the plasma treatment is to break a covalent bond that would normally enable the diaphragm to adhere on the base body 2 in the treated zone, i.e. the fluid-passing zone 25. Because of the surface treatment, the material constituting the diaphragm is capable of adhering effectively to the base body in the anchor zone, but without adhering in the fluid-passing zone. The diaphragm may be applied to the base body merely by overmolding or by co-molding. The plasma treatment may advantageously be performed while molding the dispenser head, e.g. by opening the mold once the body has been molded, by treating the anchor zone with the plasma, and then reclosing the mold to mold the diaphragm onto the body. By means of this technique, there is no need to provide a mechanical fastener element for fastening the deformable diaphragm on the base body.

Figure 6:
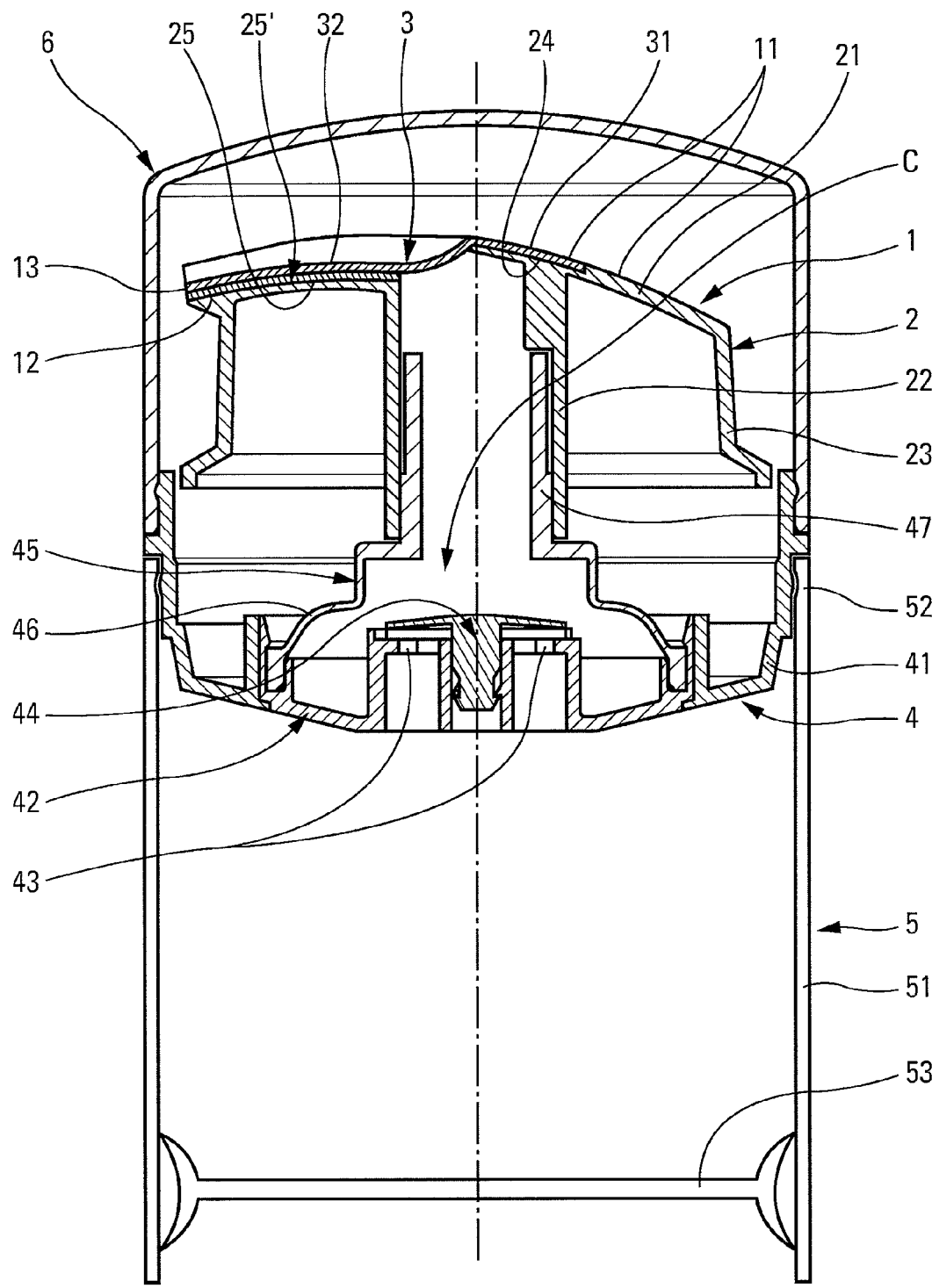
FIG. 6 is a view similar to that of FIG. 1, for a second embodiment of the invention.

Reference is now made to FIG. 6 which shows a second embodiment of the invention, in which the plasma treatment to the surface of the fluid-passing zone is replaced with, or completed by, applying a specific coating 25' that forms an interface between the body 2 and the diaphragm 3. The material constituting the coating presents properties enabling it to bond chemically with the fluid-passing zone but not with the diaphragm. The diaphragm is thus fastened to the anchor zone without sticking to the coating in the fluid-passing zone, thereby enabling it to deform elastically in order to perform its shutter function. Such a shutter member may be made by triple injection in a single mold having slides. The body is initially made by injection molding, followed by the coating 25' being made on the body, followed by the diaphragm being made on the coating.

The material of the body may be a polyolefin, such as polyethylene (PE) or polypropylene (PP). The diaphragm may be made of elastomer, and the interface coating may be made of elastomer or of styrene.

In the two embodiments described, an adhesive/non-adhesive interface is created in the fluid-passing zone, either by surface treatment of the fluid-passing zone, or by applying a coating.

Although the present invention is described with reference to a shutter member that acts both as an outlet valve member and as an outlet shutter, it is entirely possible to imagine applying a shutter member of the invention to some other location of the dispenser member, such as for example the conventional inlet valve or outlet valve that does not perform the outlet shutter function.

It should be observed that in the dispenser of FIG. 1, the base body 2 and the deformable diaphragm 3 act in the fluid-passing zone 25 and the fluid-passing portion 32 both to perform an outlet valve function and an outlet shutter function at the dispenser opening. The shutter member of the invention has a seat constituted by the fluid-passing zone 25 and a moving shutter member for bearing selectively in leaktight manner against its seat as constituted by the fluid-passing portion 32.

The invention claimed is:

1. A shutter member for a fluid dispenser member, the shutter member comprising a substantially rigid base body and an elastically deformable diaphragm, the body and the diaphragm being made of materials that are chemically compatible so that the material of the diaphragm adheres to the material of the body, the body defining an anchor zone and a fluid-passing zone chemically, the fluid-passing zone treated to prevent chemical bonding between the fluid-passing zone and the diaphragm, the diaphragm is molded on and extends over the anchor zone and the fluid-passing zone and adheres to the anchor zone and does not adhere to the fluid-passing zone due to the treatment of the fluid-passing zone, thereby defining an outlet channel for fluid below the diaphragm in the presence of fluid under pressure.

2. A shutter member according to claim 1, wherein the anchor zone surrounds the fluid-passing zone except at a side defining an opening for selectively dispensing the fluid.

3. A shutter member according to claim 1, wherein the fluid-passing zone is curved, the diaphragm matching the curvature of the fluid-passing zone at rest and deforming in substantially symmetrical manner in the presence of fluid under pressure.

4. A shutter member according to claim 1, wherein the fluid passing zome comprises a coating, the coating adhering to the fluid-passing zone and not adhering to the diaphragm.

5. A shutter member according to claim 4, wherein:
the body is made of a material selected from the polyolefin group, comprising polyethylene or polypropylene;
the diaphragm is made of a material selected from the group of elastomers that adhere to polyolefins; and
the coating is made of a material selected from the group of elastomers and styrenes.

6. A shutter member according to claim 1, wherein fluid-passing zone has been chemically modified by plasma treatment so that the diaphragm does not adhere thereto.

7. A fluid dispenser head for associating with a dispenser member, the head including a shutter member according to claim 1 and acting as an outlet shutter from which the user takes the fluid.

8. A fluid dispenser head for associating with a pump, the head including a shutter member according to claim 1 and acting as an outlet valve for a pump chamber.

9. A fluid dispenser including a shutter member according to claim 1.

10. A method of fabricating a shutter member for a fluid dispenser member, the shutter member comprising a substantially rigid base body and an elastically deformable diaphragm, the body and the diaphragm being made of materials that are chemically compatible so-that the material of the diaphragm adheres to the material of the body when molded on the body, the body defining an anchor zone and a fluid-passing zone, the method comprising chemically treating the fluid-passing zone so that the diaphragm does not adhere to the fluid-passing zone when the diaphragm is molded over the fluid-passing zone, and subsequently molding the diaphragm on the anchor zone and on the fluid-passing zone, the diaphragm adhering to the anchor zone but not adhering to the treated fluid-passing zone due to the chemical treatment of the fluid passing zone, thereby defining an outlet channel for the fluid between the treated fluid-passing zone and the diaphragm in the presence of fluid under pressure.

11. A shutter member for a fluid dispenser member, comprising:
   a base body; and
   an elastically deformable diaphragm; and
   an outlet channel
   the body and the diaphragm are made of materials that are chemically compatible so as to naturally be capable of adhering to each other by chemical bonding;
   the body defining an anchor zone and a fluid-passing zone;
   the diaphragm molded over and interfacing with the anchor zone and fluid-passing zone; and
   a surface of the fluid-passing zone chemically treated so that when the diaphragm is molded over the anchor zone and the fluid-passing zone, the diaphragm is adhered by chemical bonding to the anchor zone and extends over the treated fluid-passing zone without adhering by chemical bonding due to the treatment of the fluid-passing zone, thereby defining the outlet channel for fluid between the diaphragm and the body in the presence of fluid under pressure.

12. The shutter member according to claim 11, wherein the fluid-passing zone has been chemically treated by plasma treatment so that the diaphragm does not adhere thereto.

13. The method according to claim 12, wherein the method of chemically treating the fluid-passing zone comprises plasma treatment.

* * * * *